(12) United States Patent
De Vaan

(10) Patent No.: US 8,233,097 B2
(45) Date of Patent: Jul. 31, 2012

(54) SCANNING PROJECTOR AMBIENT LIGHTING SYSTEM

(75) Inventor: Adrianus Stephanus Maria De Vaan, 'S-Hertogenbosch (NL)

(73) Assignee: TP Vision Holding B.V., Eindhoven (NL)

( * ) Notice: Subject to any disclaimer, the term of this patent is extended or adjusted under 35 U.S.C. 154(b) by 983 days.

(21) Appl. No.: 12/282,898

(22) PCT Filed: Mar. 15, 2007

(86) PCT No.: PCT/IB2007/050900
§ 371 (c)(1),
(2), (4) Date: Sep. 15, 2008

(87) PCT Pub. No.: WO2007/107930
PCT Pub. Date: Sep. 27, 2007

(65) Prior Publication Data
US 2009/0096917 A1  Apr. 16, 2009

Related U.S. Application Data

(60) Provisional application No. 60/784,014, filed on Mar. 20, 2006.

(51) Int. Cl.
*H04N 5/74* (2006.01)
(52) U.S. Cl. ...................................................... 348/774
(58) Field of Classification Search ............. 348/553, 348/552, 744–747, 206; 353/7, 48, 28, 69, 353/30, 34
See application file for complete search history.

(56) References Cited

U.S. PATENT DOCUMENTS

| | | | | |
|---|---|---|---|---|
| 5,872,593 A | * | 2/1999 | Kawashima | 348/181 |
| 5,883,476 A | * | 3/1999 | Noguchi et al. | 315/368.12 |
| 5,898,465 A | * | 4/1999 | Kawashima et al. | 348/745 |
| 6,606,130 B1 | | 8/2003 | George | |
| 6,972,807 B2 | * | 12/2005 | Lee et al. | 348/745 |
| 7,233,312 B2 | * | 6/2007 | Stern et al. | 345/156 |
| 7,742,011 B2 | * | 6/2010 | Damera-Venkata et al. | 345/1.3 |
| 7,746,365 B2 | * | 6/2010 | Nishida | 345/697 |
| 7,938,540 B2 | * | 5/2011 | Brentnall et al. | 353/7 |
| 2003/0109304 A1 | | 6/2003 | Gauselmann | |
| 2008/0309884 A1 | * | 12/2008 | O'Dor et al. | 353/7 |
| 2009/0015791 A1 | * | 1/2009 | Chang et al. | 353/6 |

FOREIGN PATENT DOCUMENTS

| | | |
|---|---|---|
| WO | 9533340 A1 | 12/1995 |
| WO | 0117240 A1 | 3/2001 |
| WO | 0219704 A1 | 3/2002 |
| WO | 2004006578 A2 | 1/2004 |
| WO | 2005017739 A1 | 2/2005 |
| WO | 2005069637 A1 | 7/2005 |
| WO | 2005069640 A1 | 7/2005 |
| WO | 2005076602 A1 | 8/2005 |

* cited by examiner

*Primary Examiner* — Paulos Natnael
(74) *Attorney, Agent, or Firm* — Shimokaji & Assoc. PC

(57) ABSTRACT

A display device including a plurality of image projection devices and a display. The display device provides received content to the display and provides image signals to the plurality of image projection devices. In response to the provided image signals, the plurality of image projection devices project images on an area of a display surface that is separate from the display. A plurality of image capture devices positioned around the display device operate during a calibration and/or alignment procedure of the plurality of image projection devices to calibrate and/or align the projected images.

10 Claims, 3 Drawing Sheets

SCANNING PROJECTOR AMBIENT LIGHTING SYSTEM

The present system relates to video display units having ambient lighting effects wherein ambient light effects are produced by a plurality of image projectors positioned around a border of a display device.

Koninklijke Philips Electronics N.V. (Philips) and other companies have disclosed means for changing ambient or peripheral lighting to enhance video content for typical home or business applications. Ambient lighting added to a video display or television has been shown to reduce viewer fatigue and improve realism and depth of experience. Currently, Philips has a line of televisions, including flat panel televisions with ambient lighting, where a frame around the television includes ambient light sources that project ambient light on the back wall that supports or is near the television. Further, light sources separate from the television may also be controlled to produce ambient light that may be similarly controlled.

PCT Patent Application WO 2004/006570 incorporated herein by reference as if set out in entirety, discloses a system and device for controlling ambient lighting effects based on color characteristics of displayed content, such as hue, saturation, brightness, colors, speed of scene changes, recognized characters, detected mood, etc. In operation, the system analyzes received content and may utilize the distribution of the content, such as average color, over the entire display or utilize the portions of the displayed content that are positioned near the border of the display to control ambient lighting elements. The ambient light feature generally uses the video content of the display itself to generate the ambient lighting effects on a per frame basis together with temporal averaging to smooth out temporal transitions of the ambient lighting elements.

It is an object of the present system to overcome disadvantages and/or make improvements in the prior art.

The present system provides a method and display device for projecting a plurality of ambient image portions. The display device includes a plurality of image projection devices and a display. In operation, the display device provides received content to the display and provides image signals to the plurality of image projection devices. In response to the provided image signals, the plurality of image projection devices project images on a portion of a display area that is separate from the display. In one embodiment, a processor is operationally coupled to the plurality of image projection devices, the display and the image capture device. The processor analyzes the content and provides the image signals in response to the analyzed content. The image signals may be provided in response to: content that is displayed on the display, a received ambient effect script; and/or other data. In the same or another embodiment, the plurality of image projection devices is integrated into the display device.

A plurality of image capture devices may be positioned around a border of the display device and may operate during a calibration and/or alignment procedure of the plurality of image projection devices. The plurality of image projection devices may project ambient image regions on the display surface that have an overlapping image region. The image capture device may be operated to capture an image that includes the overlapping image region. The captured image may be analyzed to calibrate and/or align the projected ambient image regions based on the analyzed captured image.

The following are descriptions of illustrative embodiments that when taken in conjunction with the following drawings will demonstrate the above noted features and advantages, as well as further ones. In the following description, for purposes of explanation rather than limitation, specific details are set forth such as the particular architecture, interfaces, techniques, etc., for illustration. However, it will be apparent to those of ordinary skill in the art that other embodiments that depart from these specific details would still be understood to be within the scope of the appended claims. Moreover, for the purpose of clarity, detailed descriptions of well-known devices, circuits, and methods are omitted so as not to obscure the description of the present system.

It should be expressly understood that the drawings are included for illustrative purposes and do not represent the scope of the present system. In the accompanying drawings, like reference numbers in different drawings designate similar elements.

Figure 1:
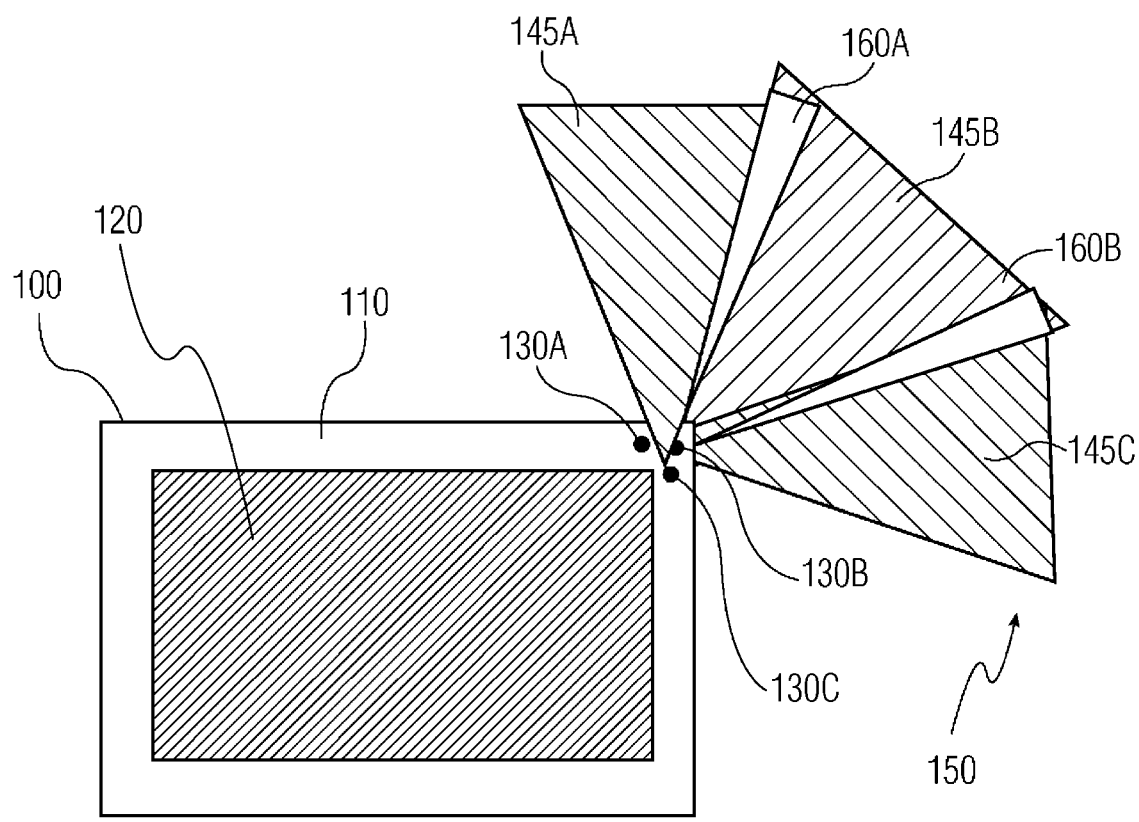
FIG. 1 shows a device according to an illustrative embodiment of the present system.

FIG. 1 shows a display device 100 positioned in front of a display surface 150, such as a wall, a ceiling, a floor, a canvas, such as positioned around a display, a dedicated projection surface, and/or any other system/method of causing an image to be provided. The display device 100 includes a bezel 110 (e.g., a border) that typically surrounds a display area 120 wherein content, such as audio/visual content, image content, television content, computer image, photo content, video streams and/or any other image is displayed. The display device also includes a plurality of image projection devices (shown in FIG. 3 as image projection devices 340A, 340B, 340C) positioned or configured to project a plurality of ambient displayed image portions 145A, 145B, 145C on the display surface 150. For example, the image projection devices 340A, 340B, 340C may be positioned towards a back side of the display device 100 such that the ambient displayed image portions 145A, 145B, 145C are displayed on the display surface 150 that is positioned in proximity to the backside of the display device 100. In this or other embodiments, the image projection devices 340 may be positioned along the bezel 110 and/or integrated into the bezel 110 to facilitate the positioning of the image projection devices 340. These or other image projection devices may also be positioned along other portions of the display device 100, such as disposed along the bezel 110, to enable projection of these or further ambient displayed image portions on different portions of the display surface 150 and/or further display surfaces, such as an overhead display surface (e.g., a ceiling).

The image projection devices may be any form of projection devices that have an ability to project a displayed image, including beamers based on liquid crystal display (LCD) technology, light emitting display (LED) technology, laser technology, etc. The image projection devices 340A, 340B, 340C each are able to display the same or different image portions, as desired and described in more detail herein below. In the figures, only three image projection devices 340A, 340B, 340C are illustratively shown merely to simplify the diagram and facilitate a description of the present system. A larger number of image projection devices dispersed around the display device 100 is clearly within the scope of the present system and enables projection of ambient displayed image portions that surround a more significant portion of the display device 100, such as the sides and/or top of the display device 100.

Narrower projections (e.g., reduced dispersion) from the image projection devices 340 enables reduced power requirements per individual image projection device, while maintaining the ambient displayed image portion safe for a user (e.g., a user's eyes). In addition, multiple image projection devices 340, such as multiple scanning laser-based pico-beamers, enable highly detailed images with sufficient brightness, sharpness, and depth of focus to be produced on the display surface 150, irrespective of an angle of incidence of the ambient displayed image portions 145 with respect to the display surface(s) 150.

As shown, the ambient displayed image portions 145A, 145B, 145C have overlapping image regions 160A, 160B wherein neighboring ambient displayed image portions overlap each other. For example, ambient displayed image portion 145A overlaps ambient displayed image portion 145B in an overlapping image region 160A. Ambient displayed image portion 145B overlaps ambient displayed image portion 145C in an overlapping image region 160B. The area of the overlapping image regions is a function of the relative placement of the image projection devices 340A, 340B, 340C to each other, the image dispersion characteristics of the image projection devices 340A, 340B, 340C, and a proximity and incidence angle of the image projection devices 340A, 340B, 340C to the display surface 150.

Clearly the positioning and dispersion characteristics of the image projection devices 340A, 340B, 340C may be known and/or fixed. However, typically the positioning and angle of incidence of the display 100 with regard to surrounding surfaces, such as walls, floor, etc. is not known in advance and often times is not fixed. For example, oftentimes the display device 100 is not affixed to any of the surfaces. Accordingly, it is difficult in advance to know the angle of incidence of the ambient displayed image portions 145 and how the ambient displayed image portions 145 will overlap. Yet, when suitable, it may be desirable to produce a coordinated image on the display surface 150 from the ambient displayed image portions 145, although clearly there may be no requirement for this, such as when the ambient displayed image portions 145 merely display color without additional image details. To facilitate producing a coordinated image from the ambient displayed image portions 145, it is desirable to determine reflection profiles of the individual image projection devices 340 with regard to the display surface(s) 150 as the coordinated image may be a function of combined ambient displayed image portions 145.

In accordance with a further embodiment of the present system, the display device 100 may include one or more image capture devices, such as cameras 130 (e.g., cameras 130A, 130B, 130C), integrated into the display device, or simply positioned around the display device, such as home monitoring cameras, cameras as used in mobile phones, and/or any other type that enable an image capture and query of the ambient displayed image portions 145 as described further herein. Since at times it may be desirous to identify how two or more ambient displayed image portions 145 overlap, one or more of the cameras 130 may capture one or more of the ambient displayed image portions 145 during a calibration procedure. More or less cameras 130 may be suitably utilized in accordance with the present system.

Figure 2:
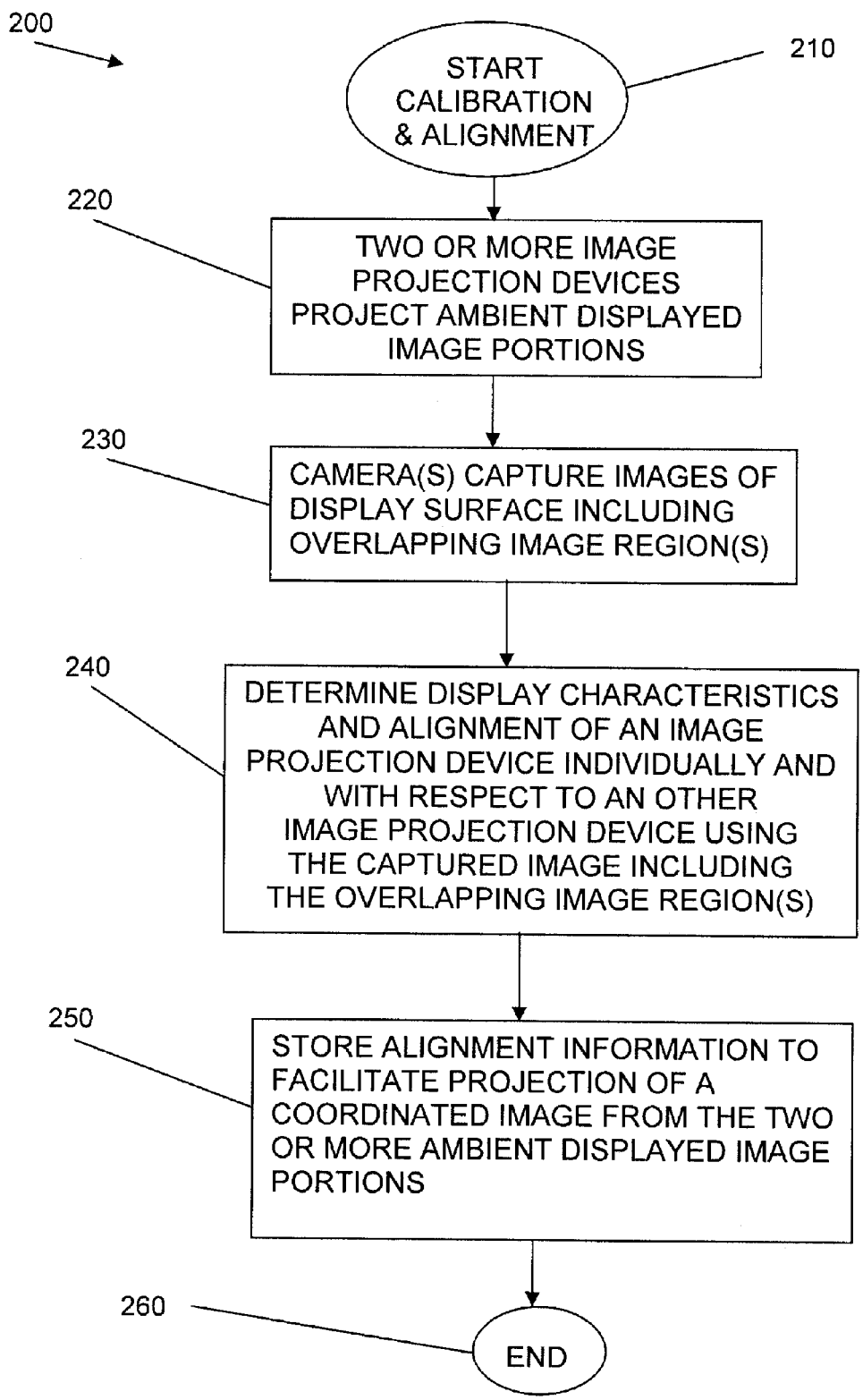
FIG. 2 shows a flow diagram in accordance with an embodiment of the present system.

FIG. 2 shows a flow diagram 200 of a calibration and alignment procedure in accordance with an embodiment of the present system. During act 210, the calibration and alignment procedure is started. The start of calibration and alignment may be initiated during a setup procedure of the display device, such as when the display device is turned on after being moved or first setup. The calibration and alignment procedure may be initiated by user selection through an input device and/or a displayed user interface on the display device 100. Further, the calibration and alignment procedure may be initiated automatically in response to a detected change in orientation of the display device or may initiated periodically to ensure alignment of ambient displayed image portions is maintained. In any event, during calibration and alignment, two or more image projection devices are enabled to produce ambient displayed image portions during act 220 that produce one or more overlapping image regions. The images projected by the two or more image projection devices are selected to provide sufficient image detail to identify each individual ambient displayed image portion in the overlapping image region. In one embodiment, the projected images may have different patterns, colors, identifying objects, etc. to enable identification of the different ambient displayed image portions. In any event, one or more cameras capture one or more images of the display surface including overlapping image region(s) during act 230.

A determination of display characteristics and alignment of an image projection device individually and with respect to another image projection device (e.g., alignment information) is made during act 240 using the captured images including the overlapping image regions(s). For example, the display characteristics of one or more image projection devices on the display surface may indicate improper color, hue, saturation, brightness (e.g., to bright or not bright enough), etc. of one or more ambient displayed image portions. The display characteristics may be a function of the image projection devices and/or a function of the display surface. During act 250, the calibration and alignment information is stored to facilitate projection of a coordinated image from the two or more ambient displayed image portions. As should be readily appreciated, this calibration and alignment procedure may be performed again immediately to confirm calibration and alignment and/or may be performed again for further image portions. In addition, clearly any one of the calibration and alignment procedure may be performed separate from the other of the calibration and alignment procedure. In any event, at some point the calibration and alignment procedure is terminated during act 260.

In one embodiment, the image projection devices may operate during normal operation of the display device to produce a coordinated image on the display surface that is derived from image content displayed on the display device or determined from ambient lighting scripts that may be executed in synchronicity with the displayed image content. In other embodiments, the image projection devices may produce alternate image content that is separate and distinct from the image content produced on the display device and/or may be utilized to produce alternate image content when the display device is displaying image content and/or even at a time when the display device is not displaying image content. For example, the alternate image content may include caller identification information for a caller using a suitable operable coupling (not shown), time/date information, image data from other available content, such as typically is displayed in a pip-in-picture window, electronic program guide (EPG) information, etc. The alternate image content may be determined from an ambient effect script that is separate from image content. For example, the ambient effect script may be arranged to create a mood and/or display a scene that is associated or not associated with image content.

Figure 3:
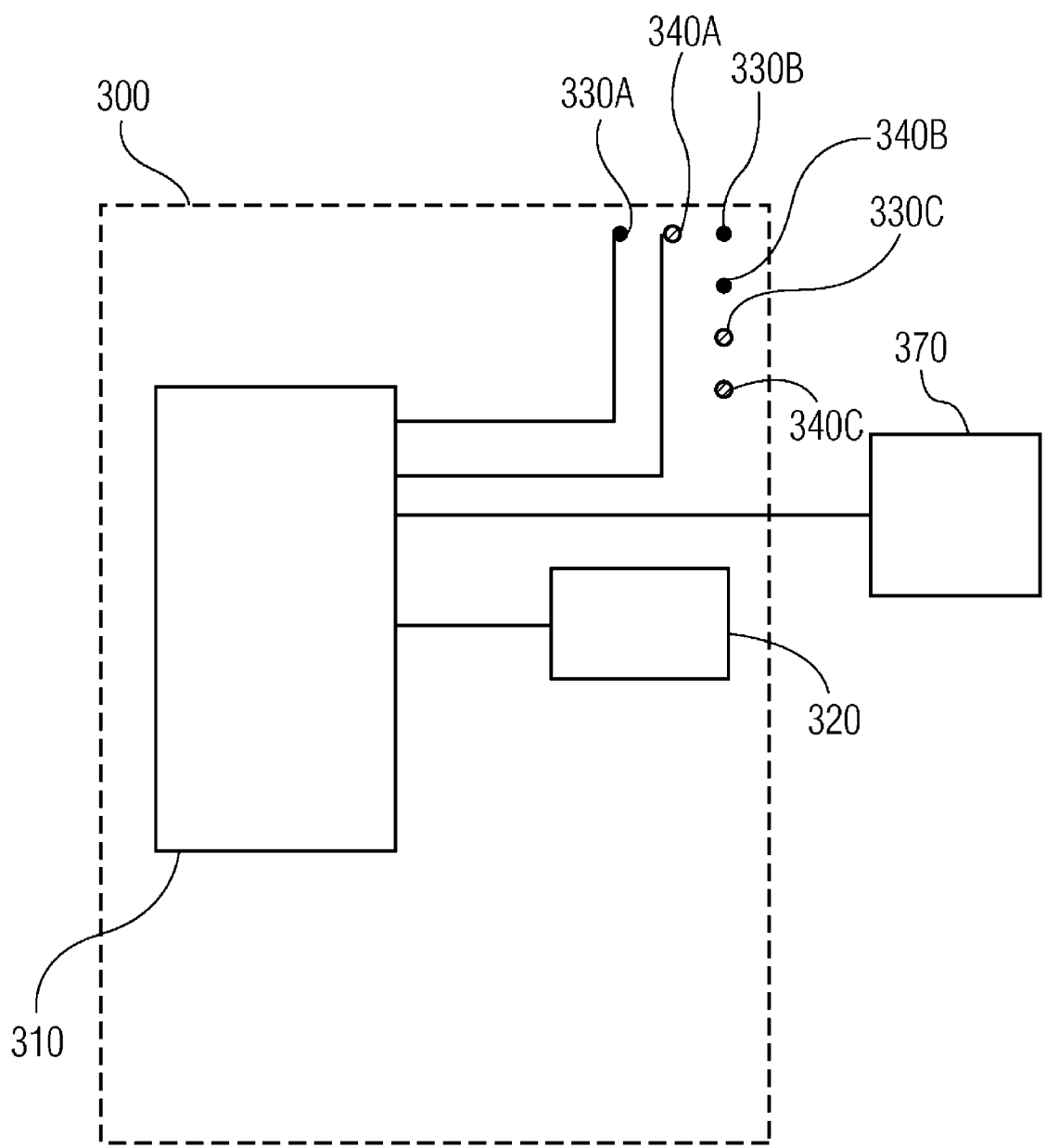
FIG. 3 shows details of a device in accordance with an embodiment of the present system.

FIG. 3 shows a display device 300 in accordance with an embodiment of the present system. The device has a processor 310 operationally coupled to a memory 320, image projection devices 340, image capture devices 330, and a user input device 370 for operation of the display device 300 and/or initiation of the calibration procedure. The memory 320 may be any type of device for storing application data as well as other data, such as alignment information and ambient effect scripts. The application data and other data are received by the processor 310 for configuring the processor 310 to perform operation acts in accordance with the present system. The operation acts include controlling the display device 300 to display content and controlling the image projection devices 340 to display ambient image portions in accordance with the present system that may be related to image content and/or may be unrelated to image content. The user input device 370 may include a keyboard, mouse, remote control or other device, including a touch sensitive display, which may be stand alone or be a part of a system, such as part of a personal computer, personal digital assistant, and display device such as a television, for communicating with the processor via any type of link, such as a wired or wireless link.

The methods of the present system are particularly suited to be carried out by a computer software program, such computer software program preferably containing modules corresponding to the individual steps or acts of the methods. Such software may of course be embodied in a computer-readable medium, such as an integrated chip, a peripheral device or memory, such as the memory 320 or other memory coupled to the processor 310.

The computer-readable medium and/or memory 320 may be any recordable medium (e.g., RAM, ROM, removable memory, CD-ROM, hard drives, DVD, floppy disks or memory cards) or may be a transmission medium (e.g., a network comprising fiber-optics, the world-wide web, cables, or a wireless channel using time-division multiple access, code-division multiple access, or other radio-frequency channel) or any combination of them. For example, in an embodiment wherein the image capture devices are not integrated into the display device, the memory 320 may include memory associated with the image capture devices. The memory 320 may also store an ambient effect script. Any medium known or developed that can store information suitable for use with a processor may be used as the computer-readable medium and/or memory 320.

Additional memories may also be used. The computer-readable medium, the memory 320, and/or any other memories may be long-term, short-term, or a combination of long-term and short-term memories. These memories configure processor 310 to implement the methods, operational acts, and functions disclosed herein. The memories may be distributed or local and the processor 310, where additional processors may be provided, may also be distributed, as for example based within the ambient lighting elements, or may be singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network is still within memory 320, for instance, because the processor 310 may retrieve the information from the network for operation in accordance with the present system. Since memory may include external memory that may be accessible via a network, a network interface in the display device to access an external memory and/or scripts running in an network connected device may also be interpreted as memory as used herein.

The processor 310 and memory 320 may be any type of processor/controller and memory, such as those described in U.S. Patent Publication No. 2003/0057887, which is incorporated herein by reference as if set out in entirety herein. The processor 310 is capable of providing control signals and/or performing operations in response to input signals from the I/O device 370 and executing instruction stored in the memory 320. The processor 310 may be an application-specific or general-use integrated circuit(s). Further, the processor 310 may be a dedicated processor for performing in accordance with the present system or may be a general-purpose processor wherein only one of many functions operates for performing in accordance with the present system. The processor 310 may operate utilizing a program portion, multiple program segments, or may be a hardware device utilizing a dedicated or multi-purpose integrated circuit.

Of course, it is to be appreciated that any one of the above embodiments or processes may be combined with one or with one or more other embodiments or processes to provide even further improvements in accordance with the present system.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. For example, a positioning of the image projection devices and image capture devices is illustratively shown in FIGS. 1, 3, however alternate positioning of the image projection devices and/or image capture devices may be suitably utilized. Further, while a display surface is discussed herein for displaying the ambient projected images, as should be clear from the discussion above, the term surface is intended to broadly cover any system, means, etc. of displaying the ambient projected images. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A display device comprising:
a plurality of image projection devices;
a display; and
a border surrounding the display device, wherein the plurality of image projection devices is positioned around a portion of the border and the display device is configured to:
provide received content to the display; and
provide image signals to the plurality of image projection devices, wherein the plurality of image projection devices is configured to project ambient images on an area of a display surface separate from the display in response to the provided image signals.

2. The display device of claim 1, comprising:
a processor operationally coupled to the plurality of image projection devices and the display, wherein the processor is configured to:
analyze the content; and
provide the image signals in response to the analyzed content.

3. The display device of claim 1, comprising:
a processor operationally coupled to the plurality of image projection devices and the display, wherein the processor is configured to:
analyze a received ambient effect script; and
provide the image signals in response to the analyzed ambient effect script.

4. The display device of claim 1, wherein the plurality of image projection devices is integrated into the display device.

5. The display device of claim 1, comprising a plurality of image capture devices configured to operate during a calibration procedure of the plurality of image projection devices.

6. The display device of claim 1, comprising a plurality of image capture devices configured to operate during an alignment of the plurality of image projection devices.

7. The display device of claim 1, comprising a plurality of image capture devices positioned around a portion of the border, wherein the image capture devices are configured to operate during at least one of a calibration and an alignment procedure of the plurality of image projection devices.

8. The display device of claim 1, comprising a plurality of image capture devices positioned around the display device, wherein the image capture devices are configured to operate during at least one of a calibration and an alignment procedure of the plurality of image projection devices.

9. The display device of claim 1, comprising:
an image capture device; and
a processor operationally coupled to the plurality of image projection devices, the display and the image capture device, wherein the plurality of image projection devices is configured to project ambient image regions on the display surface that have an overlapping image region, wherein the image capture device is configured to capture an image that includes the overlapping image region, and wherein the processor is configured to analyze the captured image and align the projected ambient image regions as determined by the analyzed captured image.

10. The display device of claim 1, comprising:
an image capture device; and
a processor operationally coupled to the plurality of image projection devices, the display and the image capture device, wherein each of the plurality of image projection devices is configured to project ambient image regions on the display surface that have an overlapping image region, wherein the image capture device is configured to capture an image that includes the overlapping image region, and wherein the processor is configured to analyze the captured image and calibrate the plurality of image projection devices as determined by the analyzed captured image.

* * * * *